United States Patent [19]

Grout

[11] Patent Number: 5,775,721
[45] Date of Patent: Jul. 7, 1998

[54] COVER FOR A GAS BAG OF AN OCCUPANT RESTRAINING SYSTEM IN VEHICLES

[75] Inventor: John Grout, Alfdorf, Germany

[73] Assignee: TRW Occupant Restraint Systems GmbH, Alfdorf, Germany

[21] Appl. No.: 644,316

[22] Filed: May 10, 1996

[30] Foreign Application Priority Data

May 12, 1995 [DE] Germany ............... 295 07 890.1

[51] Int. Cl.⁶ .................................................. B60P 1/43
[52] U.S. Cl. .................. 280/727; 280/731; 280/728.3; 428/31; 40/593
[58] Field of Search .................................. 280/727, 731, 280/728.3, 732; 428/31; 40/1.5, 622, 593, 591; 24/94; 224/619

[56] References Cited

U.S. PATENT DOCUMENTS

| | | | |
|---|---|---|---|
| 1,930,783 | 10/1933 | Watson et al. | 40/593 X |
| 1,987,215 | 1/1935 | Romig | 40/662 |
| 2,156,003 | 4/1939 | Tinnerman | 411/520 |
| 2,253,343 | 8/1941 | Nalick | 428/31 |
| 2,649,633 | 8/1953 | Purinton | 24/94 |
| 3,378,972 | 4/1968 | Stanley | 52/309.2 |
| 3,670,120 | 6/1972 | Corn et al. | 200/61.55 |
| 4,691,457 | 9/1987 | Peroni | 40/768 |
| 5,013,174 | 5/1991 | Marabotto et al. | 403/11 |
| 5,376,415 | 12/1994 | Calabro | 280/727 X |
| 5,413,826 | 5/1995 | Klonikowski | 280/727 X |

FOREIGN PATENT DOCUMENTS

| | | |
|---|---|---|
| 0523882 | 1/1993 | European Pat. Off. ......... 280/731 |
| 8531673.3 | 7/1986 | Germany. |
| 9402922.9 | 7/1994 | Germany. |
| 929685 | 6/1963 | United Kingdom. |
| 1181655 | 2/1970 | United Kingdom. |
| 2149041 | 6/1985 | United Kingdom. |

*Primary Examiner*—Christopher P. Ellis
*Attorney, Agent, or Firm*—Tarolli, Sundheim, Covell, Tummino & Szabo

[57] ABSTRACT

The invention relates to a cover for a gas bag of an occupant restraining system in vehicles comprising a cover plate (10) having a front side and a rear side, a badge (12) bearing an emblem fixed on the front side of said cover plate (10), said badge (12) having at least one attachment pin (14) formed thereon and extending through said cover plate (10), and a washer (16) cooperating with said attachment pin (14) on the rear side of said cover plate (10) in order to prevent detachment of said badge (12) from the cover plate (10), wherein said washer (16) is provided with a plurality of recesses.

5 Claims, 2 Drawing Sheets

COVER FOR A GAS BAG OF AN OCCUPANT RESTRAINING SYSTEM IN VEHICLES

BACKGROUND OF THE INVENTION

The invention relates to a cover for a gas bag of an occupant restraining system in vehicles comprising a cover plate, on which a badge bearing an emblem is fixed, the badge having on a side thereof facing said cover plate at least one attachment pin, which extends through the cover plate and on the rear side of the cover plate cooperates with a washer in order to prevent detachment of the badge from the cover plate.

Such covers are for example disclosed in the German utility model DE-U-9,402,922. The attachment pin is in this case in the form of a tubular rivet, which is crimped onto the rear side of the cover plate. Furthermore cover arrangements are known, in which the emblem is adhesively bonded to the badge and the attachment pin is secured using a conventional rivet or screw joint.

In the case of this type of attachment of the emblem badge there is the problem that on deployment of the gas bag in the course of an accident the energy acting on the emblem badge attachment, when the cover strikes the steering wheel rim, is not sufficiently dissipated and the leverage acting on the screw or rivet joint may lead to breaking of the connection.

SUMMARY OF THE INVENTION

The present invention is intended to solve this problem because in the case of a cover for a gas bag of an occupant restraining system of the type initially mentioned a washer is employed, which is provided with a plurality of recesses. Preferably the recesses extend in the washer from an outer edge thereof inward in a radial direction. Likewise, the recesses can be distributed over the area of the washer and be in the form of through holes. Preferably one or more holding elements are provided on the rear side of the cover plate engaging into the recesses and thus holding the washer to prevent displacement in the direction of the centrifugal force acting when the cover bursts open. It is an advantage if the washer also has an internal screw thread, which cuts a mating thread in the attachment pin. This internal screw thread may also be provided in a sleeve formed on the washer for receiving the attachment pin. In the case of this type of emblem badge attachment it is particularly advantageous if, on its side facing the cover plate, the washer bears a plurality of sprag edges which bite into the rear side of the cover plate like barbed hooks and prevent the washer from being turned and loosened.

The invention will now be explained in detail with reference to the drawings.

DESCRIPTION OF PREFERRED EMBODIMENTS

Figure 1:
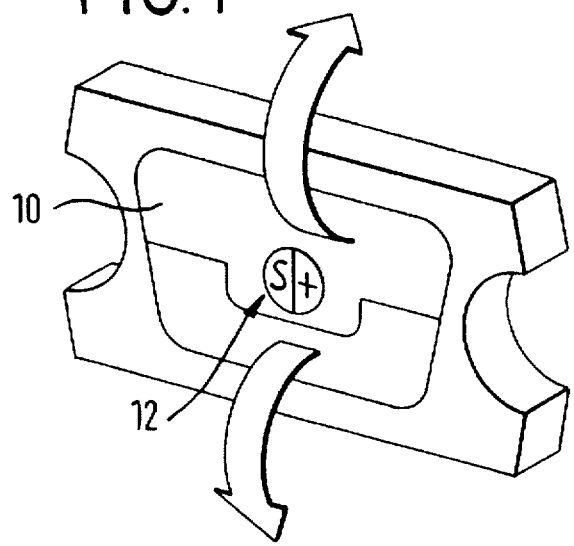
FIG. 1 is a diagrammatic perspective elevation of a cover for a gas bag of an occupant restraining system in a vehicle.

By way of example FIG. 1 shows a gas bag cover comprising a cover plate 10 of an occupant restraining system for the driver's side of a vehicle. On the front side of the cover plate 10, i.e. the side facing the driver of the vehicle, a badge 12 is fixed, the badge bearing an emblem or a logo of a vehicle manufacturer. Arrows indicate the direction of opening of the cover plate.

Figure 2:
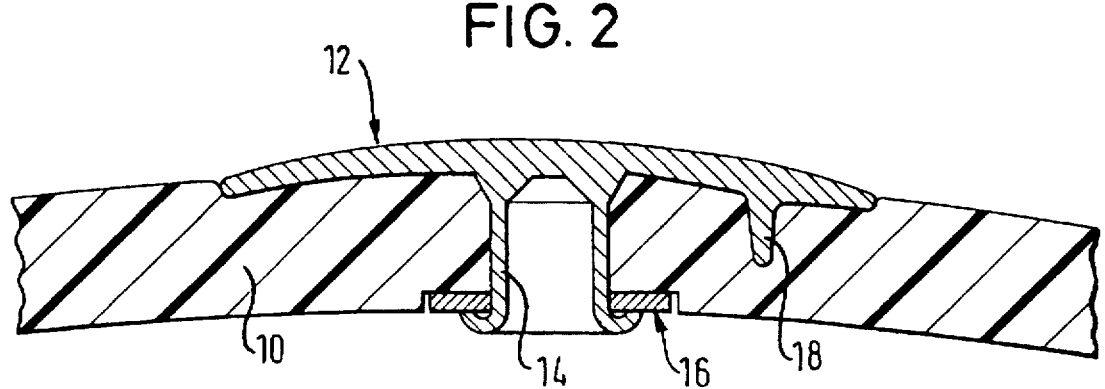
FIG. 2 is a side view through a cover plate, on which a badge is secured.

FIG. 2 shows a cross section taken through the cover plate 10 of the cover and of the badge 12. In the case of the illustrated embodiment the badge is produced from a metal blank by flow pressing. On its rear side, the badge has at least one attachment pin 14 formed thereon, which pin extends through or penetrates an opening formed in the cover plate 10. The attachment pin is designed in the form of a tubular rivet and rolled over at the rear side of the cover plate 10. Between the rolled over end section of the tubular rivet and the rear side of the cover plate 10 a washer 16 is located. The washer provides for a strong holding force of the attachment. On the rear side, which faces the front side of the cover plate 10, the badge 12 furthermore has a pin 18 formed thereon, which engages into a corresponding alignment opening formed in the front side of the cover plate. By means of such pin 18 a correct alignment of the emblem on the front side of the badge 12 is positively produced. Dependent on the size and form of the badge it is also possible for a plurality of pins 18 to be formed on its rear side. Instead of the tubular rivet depicted in FIG. 2, it is possible for any other suitable type of rivet to be employed. The attachment pin 14 can also be provided with a screw thread and be held in place by a screw joint.

Figure 3:
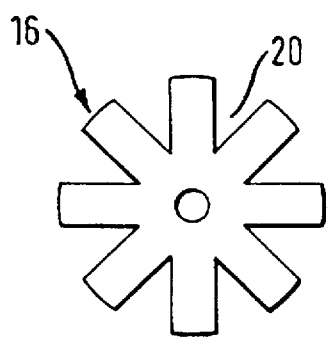
FIG. 3 is a diagrammatic representation of a washer in accordance with the invention.

FIG. 3 shows a washer 16 in accordance with the invention which is provided with recesses 20. The recesses extend from an outer edge of the washer in a radial direction inward. The washer 16 illustrated in FIG. 3 is of stellate configuration. Accordingly the washer may be readily deformed. The leverage acting on the rear end of the attachment pin when the cover impacts the steering wheel rim in the vehicle is reduced and the energy converted during such impact is more readily dissipated.

Figure 4:
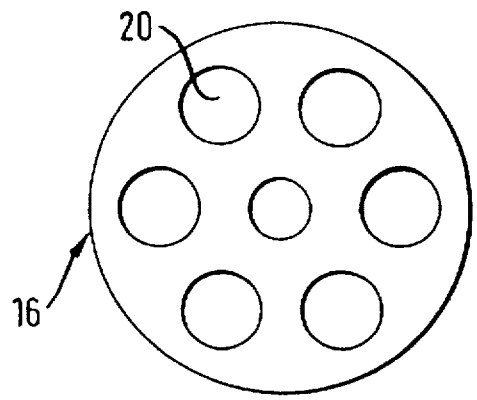
FIG. 4 shows a further embodiment of the washer in accordance with the invention.

FIG. 4 shows a further embodiment of the washer to be employed in the invention. In the case of this embodiment the recesses 20 are distributed over the area or surface of the washer and are in the form of circularly round holes. The form and furthermore the number of the recesses 20 is however freely variable as may be desired and will be dependent on the configuration and size of the washer 16. The distribution of the recesses 20 over the surface of the washer 16 is preferably symmetrical.

Figure 5:
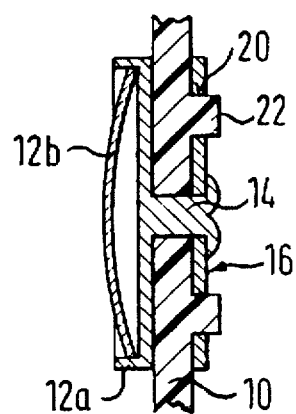
FIG. 5 shows the attachment, in accordance with the invention, of an emblem.

An advantageous further development of the cover in accordance with the invention using the washer depicted in FIG. 4, is represented in FIG. 5. In the case of this embodiment on the rear side of the cover plate 10 one or more holding elements 22 are formed, which engage into the recesses 20 in the washer 16 and accordingly additionally secure the washer to prevent slipping of same out of position. The badge 12 consists in this case of a support 12a, on whose side facing the cover plate 10 the attachment pin 14 is formed. The support 12a and the attachment pin 14 are preferably manufactured of aluminum. On the front side of the support 12a, i.e. the side facing the vehicle interior, an emblem 12b bearing the logo of the vehicle manufacturer is adhesively bonded to the support 12a. The holding elements 22 engaging into the recesses 20 in the washer 16 develop an optimum effect as regards preventing an slipping out of place of the washer. Owing to the recesses 20 the emblem fastening means generally has a lower weight.

Figure 6:
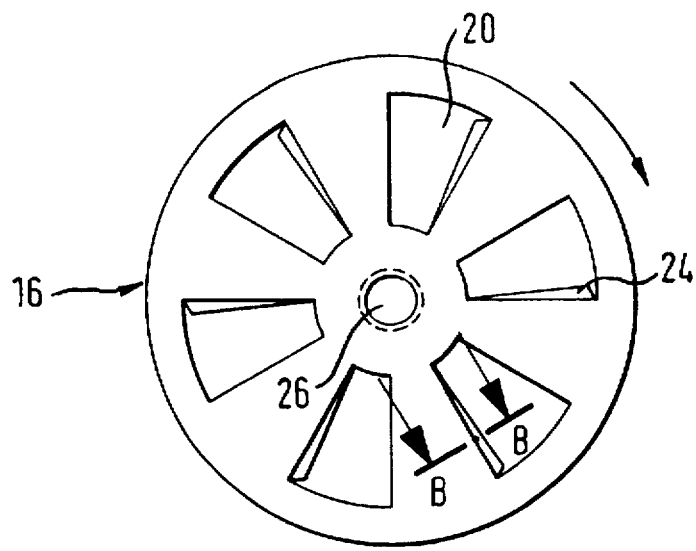
FIG. 6 shows a washer in accordance with the invention comprising an internal screw thread adapted to cut a mating thread and sprag edges.

In the case of the embodiment illustrated in FIG. 6 the washer 16 is provided with a self-cutting internal screw thread 26. This internal screw thread is adapted to cut a mating screw thread in the attachment pin, which is preferably manufactured of aluminum. The washer is tightened by turning in the direction indicated by the arrow in FIG. 6. On the side, facing the rear side of the cover plate 10, of the washer 16 a plurality of sprag edges 24 are provided. Such sprag edges 24 are preferably formed by folding over a marginal part of the recesses 20.

Figure 7:
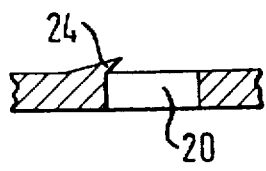
FIG. 7 shows part of the cross section taken on the line B—B through the washer of FIG. 6.

FIG. 7 shows part of the cross section of the washer 16 in accordance with the invention taken on the line B—B. The sprag edges 24 are arranged on an edge of the recesses 20 and set obliquely so that they bite into the plastic surface of the cover plate 10 and prevent undoing of the screw connection or fastening between the attachment pin 14 and the washer 16.

Figure 8:
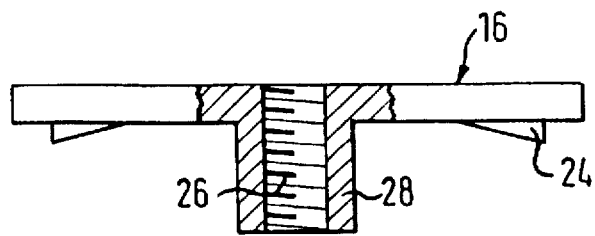
FIG. 8 shows a further cross section taken through the washer of FIG. 6.

Finally FIG. 8 shows a further cross section taken through the washer 16 comprising the internal screw thread 26, with the internal screw thread being provided in a sleeve 28. The sleeve extends at least partially into the cover plate 10 and receives the attachment pin 14. Owing to the increased size of the screw thread surface reliable holding by the screw connection between the washer 16 or, respectively, the sleeve 28 and the attachment pin 14 is ensured. The sprag edges 24 prevent in this case as well any loosening by turning of the screw joint. The function of the washer 16 in accordance with the invention would however be ensured even without the sleeve 28. This embodiment renders possible controlled assembly of the badge 12 in place by measuring and adjusting the torque when fixing the emblem. The screw connection generally ensures improved security and a better hold.

What is claimed is:

1. A cover for a gas bag of an occupant restraining system in vehicles comprising a cover plate having a front side and a rear side, a badge bearing an emblem fixed on the front side of said cover plate, said badge having at least one rivet formed thereon and extending through said cover plate, and a washer cooperating with said rivet on the rear side of said cover plate in order to prevent detachment of said badge from the cover plate, wherein said washer is provided with a plurality of openings.

2. The cover as claimed in claim 1, wherein said openings extend from an outer edge of said washer in a radial direction inward to form a stellate-like washer.

3. The cover as claimed in claim 1, wherein said openings are distributed over a surface of the washer and are in the form of through holes.

4. The cover as claimed in claim 1, further comprising at least one holding element on the rear side of the cover plate, with the at least one holding element engaging into one of said plurality of openings.

5. The cover as claimed in claim 1, wherein the badge furthermore has at least one pin formed thereon, which engages into an alignment hole formed in the front side of said cover plate.

* * * * *